United States Patent
(12) United States Patent
Yamashita et al.

(10) Patent No.: US 12,145,379 B2
(45) Date of Patent: Nov. 19, 2024

(54) THERMAL HEAD AND THERMAL PRINTER

(71) Applicant: KYOCERA CORPORATION, Kyoto (JP)

(72) Inventors: Tomoki Yamashita, Kirishima (JP); Hirotoshi Eto, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 105 days.

(21) Appl. No.: 17/907,665

(22) PCT Filed: Mar. 29, 2021

(86) PCT No.: PCT/JP2021/013395
§ 371 (c)(1),
(2) Date: Sep. 28, 2022

(87) PCT Pub. No.: WO2021/200869
PCT Pub. Date: Oct. 7, 2021

(65) Prior Publication Data
US 2023/0150273 A1 May 18, 2023

(30) Foreign Application Priority Data
Mar. 31, 2020 (JP) ................................. 2020-065150

(51) Int. Cl.
*B41J 2/335* (2006.01)

(52) U.S. Cl.
CPC ............. *B41J 2/3351* (2013.01); *B41J 2/335* (2013.01); *B41J 2/33515* (2013.01); *B41J 2/3352* (2013.01); *B41J 2/33525* (2013.01); *B41J 2/3353* (2013.01); *B41J 2/3354* (2013.01); *B41J 2/3357* (2013.01); *B41J 2/3358* (2013.01)

(58) Field of Classification Search
CPC ...... B41J 2/3351; B41J 2/335; B41J 2/33515; B41J 2/3352; B41J 2/33525; B41J 2/3353; B41J 2/3354; B41J 2/3357; B41J 2/3358
See application file for complete search history.

(56) References Cited

U.S. PATENT DOCUMENTS

2011/0018952 A1 1/2011 Koroishi et al.

FOREIGN PATENT DOCUMENTS

| | | | | | |
|---|---|---|---|---|---|
| JP | S60210469 | A | | 10/1985 | |
| JP | S61265898 | A | * | 11/1986 | ................ B41J 3/20 |
| JP | H06055756 | A | | 3/1994 | |
| JP | H07082921 | B2 | | 9/1995 | |
| JP | 2002356001 | A | | 12/2002 | |
| JP | 2004351797 | A | * | 12/2004 | ............. B41J 2/335 |
| JP | 2007229952 | A | | 9/2007 | |
| JP | 2010195023 | A | * | 9/2010 | ............. B41J 2/335 |
| JP | 201125417 | A | | 2/2011 | |
| JP | 2011110751 | A | | 6/2011 | |
| JP | 2012162018 | A | | 8/2012 | |
| JP | 201998671 | A | | 6/2019 | |
| WO | WO-2009104310 | A1 | * | 8/2009 | ........... H01L 23/055 |

* cited by examiner

*Primary Examiner* — Yaovi M Ameh
(74) *Attorney, Agent, or Firm* — HAUPTMAN HAM, LLP

(57) ABSTRACT

A thermal head includes a substrate, an electrode, and a gap. The electrode is located on the substrate. The gap is located between the substrate and the electrode. The thermal head contains glass in an inner portion of the gap.

20 Claims, 7 Drawing Sheets

THERMAL HEAD AND THERMAL PRINTER

RELATED APPLICATIONS

The present application is a National Phase of International Application No. PCT/JP2021/013395, filed Mar. 29, 2021, and claims priority based on Japanese Patent Application No. 2020-065150, filed Mar. 31, 2020.

TECHNICAL FIELD

Embodiments of this disclosure relate to a thermal head and a thermal printer.

BACKGROUND OF INVENTION

Various kinds of thermal heads for printing devices such as facsimile machines and video printers have been proposed in the related art.

Furthermore, a thermal head on which an electrode containing glass is applied is known (e.g., Patent Document 1).

CITATION LIST

Patent Literature

Patent Document 1: JP 2011-110751 A

SUMMARY

In an aspect of an embodiment, a thermal head includes a substrate, an electrode, and a gap. The electrode is located on the substrate. The gap is located between the substrate and the electrode. The thermal head includes glass and a conductive component in an inner portion of the gap. In one or more embodiments, the conductive component may be closer to the substrate than the glass in the inner portion of the gap. In one or more embodiments, the conductive component may have a different composition from the electrode.

In an aspect of an embodiment, a thermal printer includes the thermal head described above, a transport mechanism, and a platen roller. The transport mechanism transports a recording medium on a heat generating part located on the substrate. The platen roller presses the recording medium on the heat generating part.

DESCRIPTION OF EMBODIMENTS

Embodiments of a thermal head and a thermal printer disclosed in the present application will be described below with reference to the accompanying drawings. Note that this invention is not limited to each of the embodiments that will be described below.

EMBODIMENTS

Figure 1:
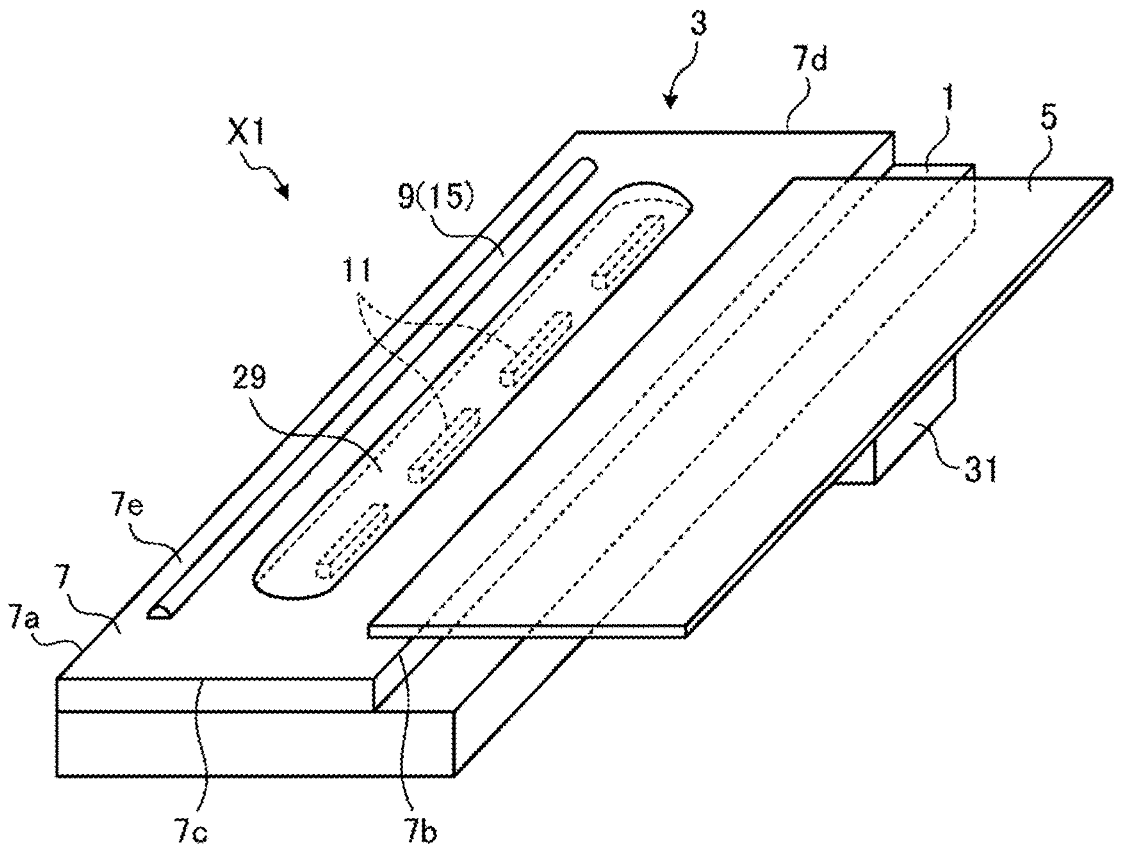
FIG. 1 is a perspective view schematically illustrating a thermal head according to an embodiment.

FIG. 1 is a perspective view schematically illustrating a thermal head according to an embodiment. In the embodiment, a thermal head X1 includes a heat dissipation body 1, a head base 3, and a flexible printed circuit board (FPC) 5 as illustrated in FIG. 1. The head base 3 is located on the heat dissipation body 1. The FPC 5 is electrically connected to the head base 3. The head base 3 includes a substrate 7, a heat generating part 9, a drive IC 11, and a covering member 29.

The heat dissipation body 1 has a plate-like shape and has a rectangular shape in plan view. The heat dissipation body 1 has a function of dissipating the heat generated by the heat generating part 9 of the head base 3, especially heat not contributing to printing. The head base 3 is bonded to an upper surface of the heat dissipation body 1 using a double-sided tape, an adhesive, or the like (not illustrated). The heat dissipation body 1 is made of, for example, a metal material such as copper, iron, or aluminum.

The head base 3 has a plate-like shape and has a rectangular shape in plan view. The head base 3 includes each member constituting the thermal head X1 located on the substrate 7. The head base 3 performs printing on a recording medium P in accordance with an electrical signal supplied from the outside (see FIG. 11).

A plurality of drive ICs 11 are located on the substrate 7 and arranged in a main scanning direction. The drive ICs 11 are electronic components having a function of controlling a conductive state of the heat generating part 9. A switching member including a plurality of switching elements inside may be used for the drive IC 11.

The drive IC 11 is covered by a covering member 29 made of a resin such as an epoxy resin or a silicone resin. The covering member 29 is located across the plurality of drive ICs 11. The covering member 29 is an example of a sealing material.

The FPC 5 is electrically connected to the head base 3 at one end and is electrically connected to a connector 31 at the other end.

Figure 2:
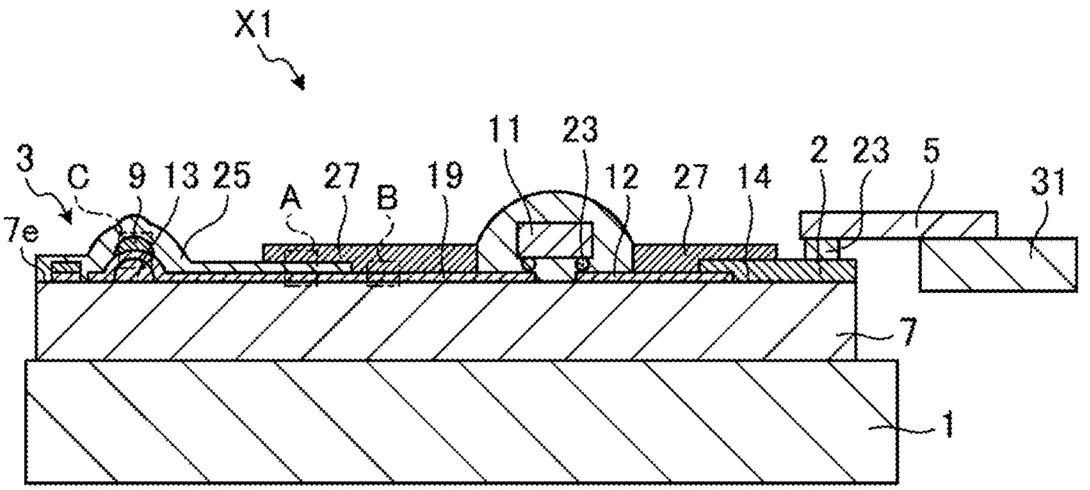
FIG. 2 is a cross-sectional view schematically illustrating the thermal head illustrated in FIG. 1.

The FPC 5 is electrically connected to the head base 3 using an electrically conductive bonding material 23 (see FIG. 2). An example of the electrically conductive bonding material 23 may include a solder material or an anisotropic conductive film (ACF) in which electrically conductive particles are mixed into an electrically insulating resin.

Figure 3:
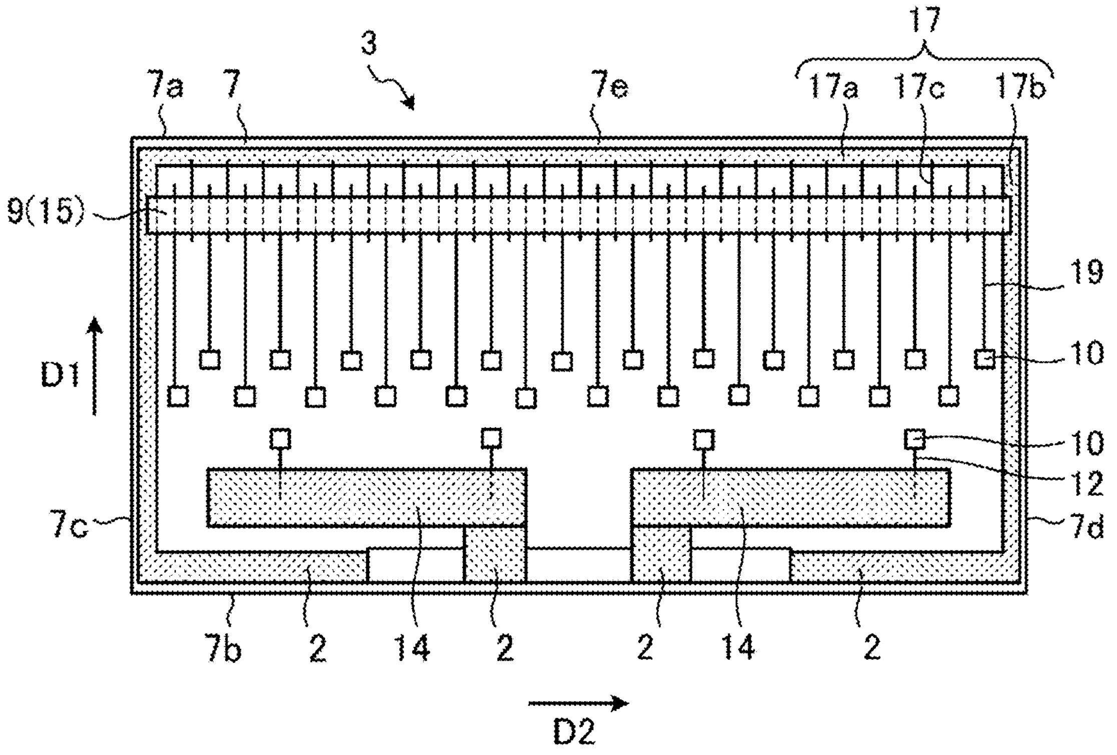
FIG. 3 is a plan view schematically illustrating a head base illustrated in FIG. 1.

Hereinafter, each of the members constituting the head base 3 will be described using FIGS. 1 to 3. FIG. 2 is a cross-sectional view schematically illustrating the thermal head illustrated in FIG. 1. FIG. 3 is a plan view schematically illustrating the head base illustrated in FIG. 1.

The head base 3 further includes the substrate 7, a common electrode 17, an individual electrode 19, a first electrode 12, a second electrode 14, a terminal 2, a heat generating resistor 15, a protective layer 25, and a covering layer 27. Note that, in FIG. 1, the protective layer 25 and the covering layer 27 are omitted. FIG. 3 illustrates wiring of the head base 3 in a simplified manner, and in FIG. 3, the drive IC 11, the protective layer 25, and the covering layer 27 are omitted. In FIG. 3, a configuration of the second electrode 14 is illustrated in a simplified manner.

The substrate 7 has a rectangular shape in plan view. A main surface (upper surface) 7*e* of the substrate 7 includes a first long side 7*a* that is one long side, a second long side 7*b* that is the other long side, a first short side 7*c*, and a second short side 7*d*. The substrate 7 is made of an electrically insulating material such as an alumina ceramic or a semiconductor material such as monocrystalline silicon.

The substrate 7 may include a heat storage layer 13. The heat storage layer 13 protrudes from the main surface 7*e* in the thickness direction of the substrate 7, and extends in a strip shape in a second direction D2 (the main scanning direction). The heat storage layer 13 functions to cause the recording medium to be printed to be favorably pressed against the protective layer 25 located over the heat generating part 9. The heat storage layer 13 is located below the heat generating part 9 (the heat generating resistor 15) as illustrated in FIG. 2. Although not illustrated, the heat storage layer 13 is located below the heat generating part 9 (the heat generating resistor 15) at the same position as the heat generating part 9 (the heat generating resistor 15) in plan view in FIGS. 1 and 3. Note that the heat storage layer 13 may be located not only in the region immediately below the heat generating part 9 (the heat generating resistor 15), but also in a wider region including the region immediately below the heat generating part 9. Hereinafter, the portion on the main surface 7*e* in which the heat storage layer 13 is not located may be referred to as a "non-disposition area of the heat storage layer 13".

Note that the heat storage layer 13 may include an underlying portion. In this case, the underlying portion is a portion located in the entire area of the heat storage layer 13 on the main surface 7*e* of the substrate 7.

The heat storage layer 13 contains, for example, a glass component. The heat storage layer 13 temporarily stores some of the heat generated by the heat generating part 9, and thus the time to increase the temperature of the heat generating part 9 can be shortened. This functions to enhance the thermal response properties of the thermal head X1.

The heat storage layer 13 is made by, for example, applying a predetermined glass paste obtained by mixing glass powder with an appropriate organic solvent onto the main surface 7*e* of the substrate 7 using a known screen printing method or the like, and firing the main surface. Note that the substrate 7 may have only an underlying portion as the heat storage layer 13.

The common electrode 17 is located on the main surface 7*e* of the substrate 7 as illustrated in FIG. 3. The common electrode 17 is made of an electrically conductive material, and examples thereof include at least one metal selected from aluminum, gold, silver, and copper, or an alloy of these metals.

The common electrode 17 includes a first common electrode 17*a*, a second common electrode 17*b*, a third common electrode 17*c*, and a terminal 2 as illustrated in FIG. 3. The common electrode 17 is electrically connected in common to the heat generating part 9 including a plurality of elements.

The first common electrode 17*a* is located between the first long side 7*a* of the substrate 7 and the heat generating part 9, and extends in the main scanning direction. The plurality of second common electrodes 17*b* are located respectively along the first short side 7*c* and the second short side 7*d* of the substrate 7. Each of the plurality of second common electrodes 17*b* connects the corresponding terminal 2 and the first common electrode 17*a*. Each of the third common electrodes 17*c* extends from the first common electrode 17*a* toward a corresponding element of the heat generating part 9, and a part of the third common electrode 17*c* extends through the heat generating part 9 to the side opposite to the heat generating part 9. The third common electrodes 17*c* are located at intervals in the second direction D2 (the main scanning direction).

The individual electrode 19 is located on the main surface 7*e* of the substrate 7. The individual electrode 19 contains a metal component and thus has electrical conductivity. The individual electrode 19 is made of, for example, a metal such as aluminum, nickel, gold, silver, platinum, palladium, or copper, and an alloy of these metals. The individual electrode 19 made of gold has a high conductivity. A plurality of individual electrodes 19 are located in the main scanning direction and each of them is located between adjacent third common electrodes 17*c*. As a result, in the thermal head X1, the third common electrodes 17*c* and the plurality of individual electrodes 19 are alternately arranged in the main scanning direction. Each individual electrode 19 is connected to an electrode pad 10 at a portion close to the second long side 7*b* of the substrate 7.

The first electrode 12 is connected to the electrode pad 10 and extends in the main scanning direction. The drive IC 11 is mounted on the electrode pad 10 as described above.

The second electrode 14 extends in the main scanning direction and is located over a plurality of first electrodes 12. The second electrode 14 is connected to the outside via the terminal 2.

The terminal 2 is located on the second long side 7*b* side of the substrate 7. The terminal 2 is connected to the FPC 5 via the electrically conductive bonding material 23 (see FIG. 2). In this way, the head base 3 is electrically connected to the outside.

As an electrode material of the above-described individual electrode 19 and the first electrode 12, a conductor paste containing a metal component and a glass component having a particle size from about 0.01 to 10 μm, for example, in an organic solvent can be used. The individual electrode 19 and the first electrode 12 can be made by forming a material layer constituting each electrode on the substrate 7 using, for example, a screen printing method, a flexographic printing method, a gravure printing method, a gravure offset printing method, or the like. Note that a thickness of each of the individual electrode 19 and the first electrode 12 is, for example, approximately from 0.5 to 5 μm. The above-described electrodes may be formed, for example, by sequentially layering the electrodes using a known thin film forming technique such as a sputtering method, and then processing the layered body into a predetermined pattern by using known photoetching, or the like.

For the material layer constituting the individual electrode 19 and the first electrode 12, for example, a conductor paste containing a metal component and a glass component having a particle size of approximately from 0.01 to 10 μm in an organic solvent can be used.

The above-described first common electrode 17*a*, the second common electrode 17*b*, the third common electrode 17*c*, the second electrode 14, and the terminal 2 can be formed by forming a material layer constituting each electrode on the substrate 7 using, for example, a screen printing method. A thickness of each of the first common electrode 17*a*, the second common electrode 17*b*, the third common electrode 17*c*, the second electrode 14, and the terminal 2 is approximately from 5 to 20 μm. By forming the thick electrode in this manner, the wiring resistance of the head base 3 can be reduced. Note that the portion of the thick electrode is illustrated by dots in FIG. 3, and this also applies to the following drawings.

The heat generating resistor 15 is located across the third common electrode 17*c* and the individual electrode 19 and spaced apart from the first long side 7*a* of the substrate 7. A portion of the heat generating resistor 15 located between the third common electrode 17*c* and the individual electrode 19 functions as each element of the heat generating part 9. Although each element of the heat generating part 9 is illustrated in a simplified manner in FIG. 3, the elements are located at a density from, for example, 100 dpi to 2400 dpi (dot per inch) or the like.

The heat generating resistor 15 may be formed, for example, by placing a material paste containing ruthenium oxide as a conductive component on the substrate 7 including the patterned various electrodes in a long strip-like shape elongated in the main scanning direction using a screen printing method or a dispensing device.

The protective layer 25 is located over the heat storage layer 13 formed on the main surface 7*e* of the substrate 7 (see FIG. 1) and covers the heat generating part 9. The protective layer 25 is located extending from the first long side 7*a* of the substrate 7 but separated from the electrode pad 10 and extending in the main scanning direction of the substrate 7.

The protective layer 25 has an insulating property and protects the covered region from corrosion due to deposition of moisture and the like contained in the atmosphere, or from wear due to contact with the recording medium to be printed. The protective layer 25 can be made of, for example, glass using a thick film forming technique such as printing.

The protective layer 25 may be formed using SiN, $SiO_2$, SiON, SiC, diamond-like carbon, or the like. Note that the protective layer 25 may be a single layer or be formed by layering a plurality of protective layers 25. The protective layer 25 such as that described above can be formed using a thin film forming technique such as a sputtering method.

The covering layer 27 is located on the substrate 7 such that the covering layer partially covers the common electrode 17, the individual electrode 19, the first electrode 12, and the second electrode 14. The covering layer 27 protects the covered region from oxidation due to contact with the atmosphere or from corrosion due to deposition of moisture and the like contained in the atmosphere. The covering layer 27 can be made of a resin material such as an epoxy resin, a polyimide resin, or a silicone resin.

Figure 4:
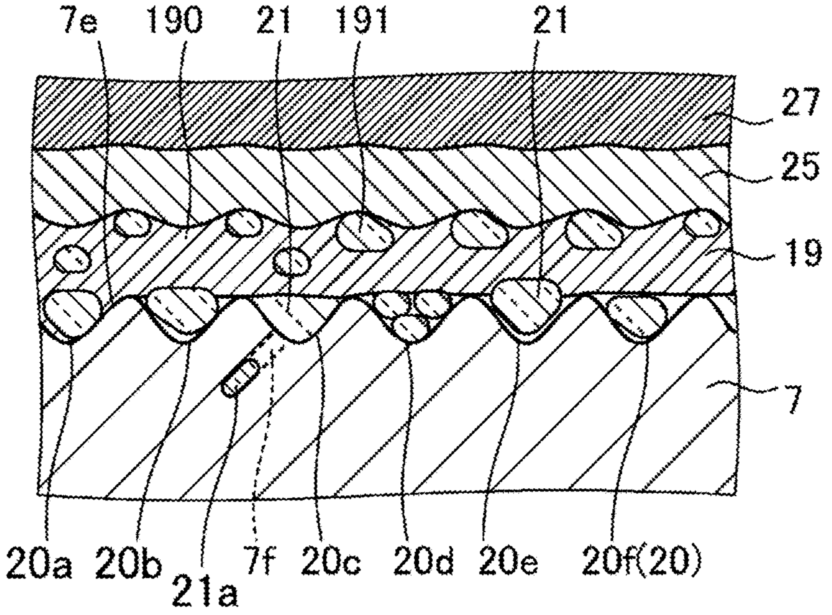
FIG. 4 is an enlarged cross-sectional view of a region A illustrated in FIG. 2.
Figure 5:
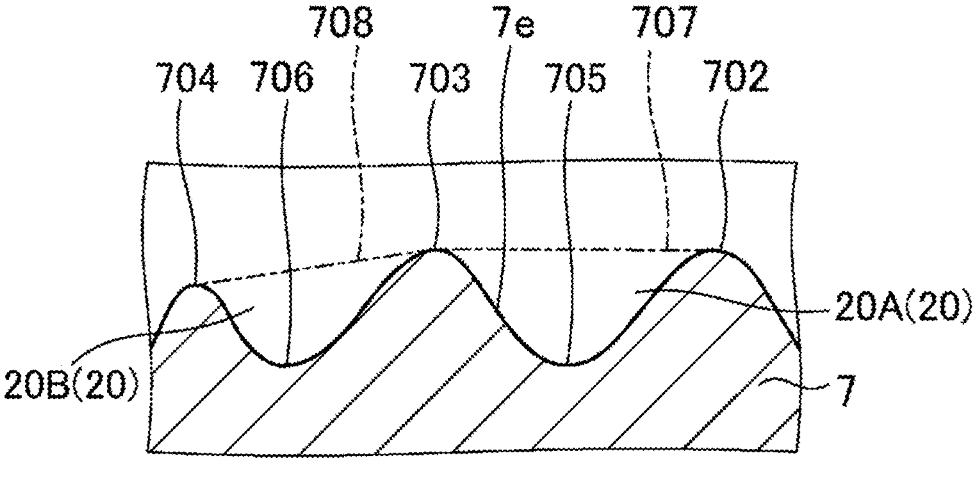
FIG. 5 is an enlarged cross-sectional view for describing a shape of a main surface of the substrate.

The main portion of the thermal head X1 according to an embodiment will be described in detail with reference to FIGS. 4 and 5. FIG. 4 is an enlarged cross-sectional view of a region A illustrated in FIG. 2. FIG. 5 is an enlarged cross-sectional view for describing a shape of the main surface of the substrate.

The substrate 7, the individual electrode 19, the protective layer 25, and the covering layer 27 are located in the region A as illustrated in FIG. 4.

The individual electrode 19 is located on the substrate 7. A gap 20 is located between the substrate 7 and the individual electrode 19.

The main surface 7*e* of the substrate 7 is an uneven surface, and a plurality of protruding portions 702 to 704 and a plurality of recessed portions 705 and 706 are alternately located as illustrated in FIG. 5. The individual electrode 19 does not conform to the uneven main surface 7*e* in a case of where the individual electrode 19 is formed by printing and firing the electrode material, for example, and is located while supported by the protruding portions 702 to 704 of the main surface 7*e*. For this reason, the gap 20 is located between the substrate 7 and the individual electrode 19.

Glass 21 is located in an inner portion of the gap 20. Since the glass 21 is located in the inner portion of the gap 20, the contact area between the substrate 7 and the individual electrode 19 increases via the glass 21, compared to a case where the glass 21 is not located. For this reason, the individual electrode 19 is less likely to peel or disconnect from the substrate 7. As a result, in the embodiment, the thermal head X1 has improved durability.

Here, the "inner portion of the gap 20" refers to the portion located on the recessed portion 705 side in a gap 20A from the line segment 707 connecting the protruding portion 702 and the protruding portion 703, for example, when the substrate 7 is viewed in a cross section as illustrated in FIG. 5. For example, also in a case of a gap 20B with the protruding portion 704 having different dimensions in the thickness direction of the substrate 7 from those of the protruding portions 702 and 703, the "inner portion of the gap 20B" refers to the portion located on the recessed portion 706 side from the line segment 708 connecting the adjacent protruding portion 703 and protruding portion 704.

The glass 21 located in the inner portion of the gap 20 may protrude from the individual electrode 19 (see, e.g., a gap 20*e*) as illustrated in FIG. 4. When the glass 21 protrudes from the individual electrode 19 and is located in the inner portion of the gap 20 as described above, the contact area between the substrate 7 and the individual electrode 19 increases. For this reason, the individual electrode 19 is less likely to peel or disconnect from the substrate 7. As a result, in the embodiment, the thermal head X1 has improved durability.

The gap 20 may be filled with the glass 21 (see, e.g., a gap 20*c*). Here, "the gap 20 is filled with" refers to, for example, a case where the gap 20A is filled with the glass 21 in the area of 80% or greater of the portion on the recessed portion 705 side from the line segment 707 connecting the protruding portion 702 and the protruding portion 703, when the substrate 7 is viewed in a cross section as illustrated in FIG. 5. When the gap 20 is filled with the glass 21 as described above, the contact area between the substrate 7 and the individual electrode 19 further increases. For this reason, the individual electrode 19 is less likely to peel or disconnect from the substrate 7. As a result, in the embodiment, the thermal head X1 has improved durability.

The glass 21 may connect the individual electrode 19 and the substrate 7 via the gap 20 (e.g., see a gap 20*b*). When the glass 21 connects the individual electrode 19 and the substrate 7 via the gap 20 as described above, the contact area of the substrate 7 and the individual electrode 19 and the glass 21 increases. For this reason, the individual electrode 19 is less likely to peel or disconnect from the substrate 7. As a result, in the embodiment, the thermal head X1 has improved durability.

The glass 21 may be located only in the inner portion of the gap 20 (see, e.g., a gap 20*f*). Even when the glass 21 is located only in the inner portion of the gap 20 without coming into contact with the individual electrode 19 as described above, the glass 21 is in contact with the individual electrode 19 in the depth direction from the illustrated surface. For this reason, the individual electrode 19 is less likely to peel or disconnect from the substrate 7, compared to the case in which no glass 21 is located in the inner portion of the gap 20. As a result, in the embodiment, the thermal head X1 has improved durability.

A plurality of pieces of glass 21 may be located in one gap 20 (see, e.g., a gap 20*d*). Even when a plurality of pieces of glass 21 is located in the inner portion of one gap 20, the contact area between the substrate 7 and the individual electrode 19 increases. For this reason, the individual electrode 19 is less likely to peel or disconnect from the substrate 7, compared to the case in which no glass 21 is located in the inner portion of the gap 20. As a result, in the embodiment, the thermal head X1 has improved durability.

A conductive component 190 may be located in the inner portion of the gap 20 together with the glass 21 (see, e.g., a gap 20*a*). The conductive component 190 may be, for example, a metal such as aluminum, nickel, gold, silver, platinum, palladium, or copper, and an alloy of these metals. The individual electrode 19 that is an electrode contains the conductive component 190 and a glass component 191. A part of the glass component 191 turns into the glass 21 located in the inner portion of the gap 20 through a firing process. In this case, the individual electrode 19 is less likely to peel or disconnect from the substrate 7 even when a part of the conductive component 190 included in the individual electrode 19 is located in the inner portion of the gap 20, compared to the case in which no glass 21 is located in the inner portion of the gap 20. As a result, in the embodiment, the thermal head X1 has improved durability. Note that the conductive component 190 located in the inner portion of the gap 20 may have a different composition from the conductive component 190 included in the individual electrode 19.

Glass 21*a* may be located inside the substrate 7. The glass 21*a* is located inside a hole 7*f* open to the main surface 7*e* of the substrate 7. Since the glass 21*a* is located inside the hole 7*f*, the substrate 7 improves in insulating properties. Since the glass 21*a* is located inside the hole 7*f*, improvement in the heat storage properties can be expected.

The protective layer 25 is located on the individual electrode 19. For example, when the protective layer 25 contains a glass component, and the protective layer 25 covers the individual electrode 19 containing the glass component 191, this improves the adhesiveness between the individual electrode 19 and the protective layer 25. In particular, when the glass component 191 is located in the upper layer portion of the individual electrode 19 facing the protective layer 25, the adhesiveness between the individual electrode 19 and the protective layer 25 is further improved. As a result, in the embodiment, the thermal head X1 has improved durability.

The substrate 7 may contain a glass component. For example, an underlying portion of the substrate 7 contains a glass component. When the individual electrode 19 is located on the substrate 7 containing the glass component, the adhesiveness between the individual electrode 19 and the substrate 7 is further improved. As a result, in the embodiment, the thermal head X1 has improved durability.

Figure 6:
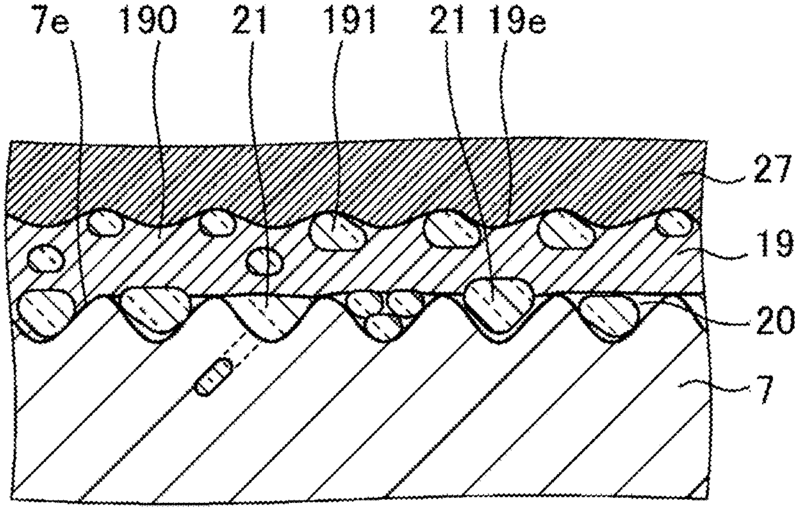
FIG. 6 is an enlarged cross-sectional view of a region B illustrated in FIG. 2.
Figure 7:
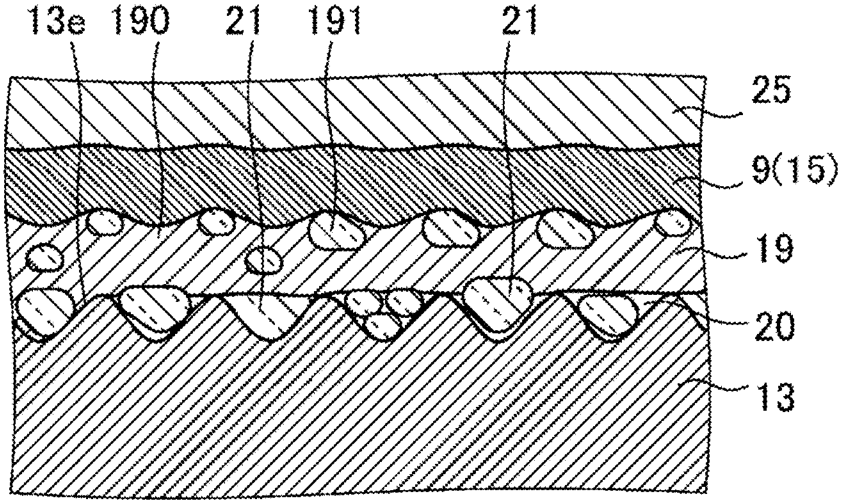
FIG. 7 is an enlarged cross-sectional view of a region C illustrated in FIG. 2.

More description will be given next using FIGS. 6 and 7. FIG. 6 is an enlarged cross-sectional view of a region B illustrated in FIG. 2. FIG. 7 is an enlarged cross-sectional view of a region C illustrated in FIG. 2.

The substrate 7, the individual electrode 19, and the covering layer 27 are located in the region B as illustrated in FIG. 6. The region B has a configuration the same as and/or similar to that of the region A illustrated in FIG. 2 except that the protective layer 25 is not located on the individual electrode 19.

The covering layer 27 is located on the individual electrode 19 as illustrated in FIG. 6. For example, the surface roughness of an upper surface 19*e* of the individual electrode 19 facing the covering layer 27 is less than the surface roughness of the main surface 7*e* of the substrate 7. For this reason, a film defect of the covering layer 27 is less likely to occur. As a result, in the embodiment, the thermal head X1 has improved durability.

The heat storage layer 13, the individual electrode 19, the heat generating part 9, and the covering layer 27 are located in the region C as illustrated in FIG. 7.

The individual electrode 19 is located on the heat storage layer 13 as illustrated in FIG. 7. The gap 20 is located between the heat storage layer 13 and the individual electrode 19.

Glass 21 is located in an inner portion of the gap 20. When the glass 21 is located in the inner portion of the gap 20, the contact area between the heat storage layer 13 and the individual electrode 19 increases via the glass 21 compared to when no glass 21 is located. For this reason, the individual electrode 19 is less likely to peel or disconnect from the heat storage layer 13. As a result, in the embodiment, the thermal head X1 has improved durability.

The heat storage layer 13 contains a glass component as described above. Thus, when the individual electrode 19 is located on the heat storage layer 13, the adhesiveness between the individual electrode 19 and the heat storage layer 13 is improved. As a result, in the embodiment, the thermal head X1 has improved durability.

The heat generating resistor 15 (the heat generating part 9) is located on the individual electrode 19. When the heat generating resistor 15 is located on the individual electrode 19 containing the glass component 191, the adhesiveness between the individual electrode 19 and the heat generating resistor 15 is further improved. In particular, when the glass component 191 is located in the upper layer portion of the individual electrode 19 facing the heat generating resistor 15, the adhesiveness between the individual electrode 19 and the heat generating resistor 15 is further improved. As a result, in the embodiment, the thermal head X1 has improved durability.

Variation

Figure 8:
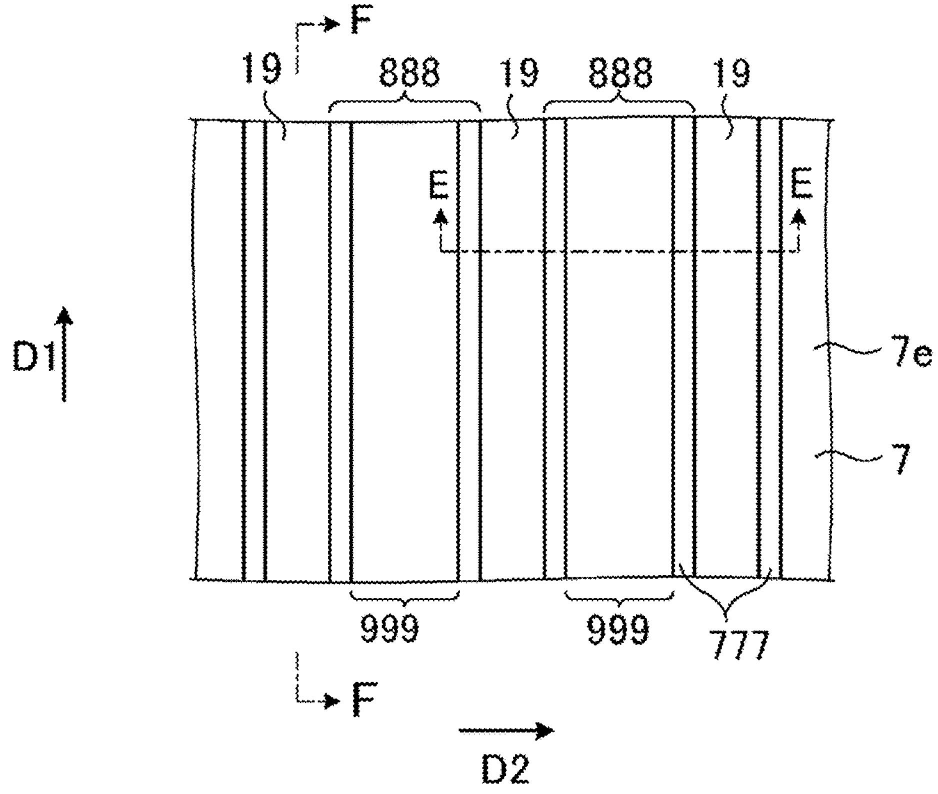
FIG. 8 is a plan view illustrating a main portion of a thermal head according to a variation of the embodiment.
Figure 9:
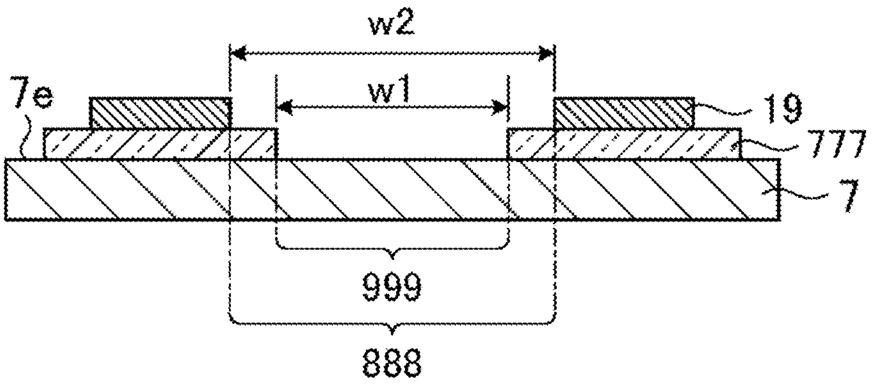
FIG. 9 is a cross-sectional view taken along line E-E illustrated in FIG. 8.
Figure 10:
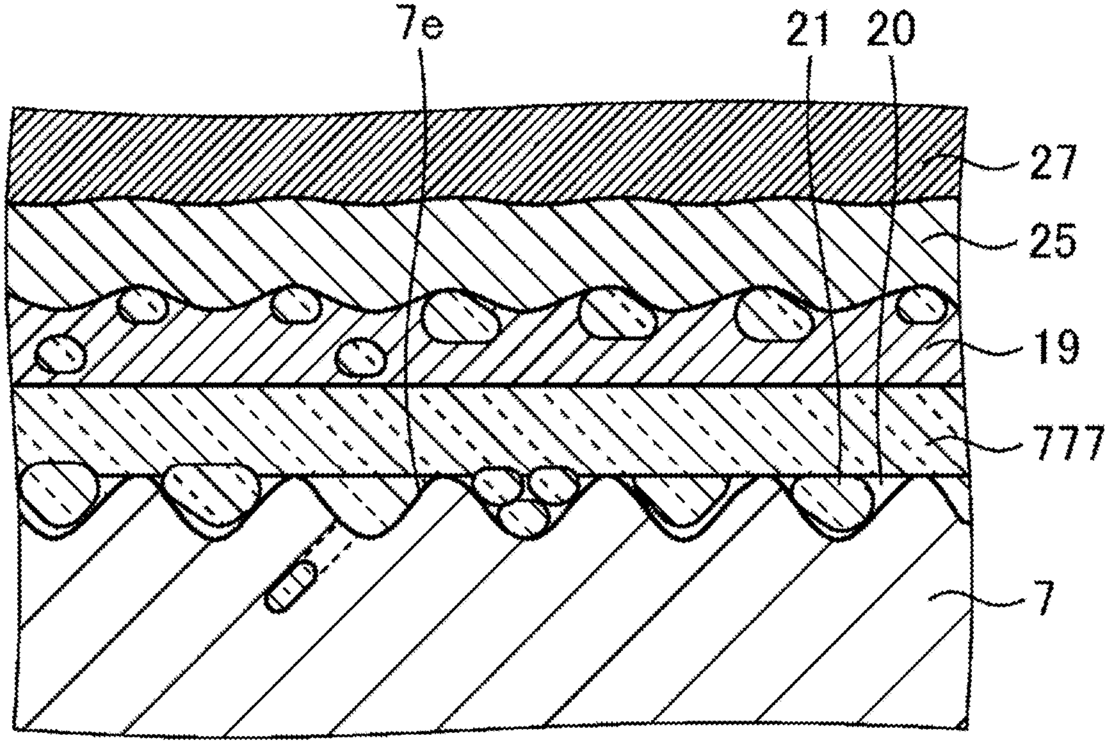
FIG. 10 is a cross-sectional view taken along line F-F illustrated in FIG. 8.

FIG. 8 is a plan view illustrating the main portion of a thermal head according to a variation of the embodiment. FIG. 9 is a cross-sectional view taken along line E-E illustrated in FIG. 8. FIG. 10 is a cross-sectional view taken along line F-F illustrated in FIG. 8. Note that illustration of some configurations illustrated in FIG. 10 is omitted in FIGS. 8 and 9.

FIG. 8 illustrates the individual electrode 19 in plan view. The individual electrode 19 is located in a non-disposition area of the heat storage layer 13 where no heat storage layer 13 is located on the main surface 7*e* of the substrate 7. The non-disposition area of the heat storage layer 13 may include a bonding layer 777 located between the substrate 7 and the individual electrode 19 as illustrated in FIGS. 8 to 10. The protective layer 25 and the covering layer 27 may be located on the individual electrode 19 in this order.

The bonding layer 777 is a portion protruding from the main surface 7*e* in the thickness direction of the substrate 7, and is located between the substrate 7 and the individual electrode 19. The individual electrode 19 is located on the bonding layer 777. The gap 20 is located between the substrate 7 and the bonding layer 777 as illustrated in FIG. 10.

The bonding layer 777 contains, for example, a glass component. Glass 21 from the bonding layer 777 is located in an inner portion of the gap 20. When the glass 21 is located in the inner portion of the gap 20, the contact area between the bonding layer 777 and the substrate 7 increases via the glass 21 compared to when no glass 21 is located.

Since the bonding layer 777 contains a glass component, when the individual electrode 19 is located on the bonding layer 777, the adhesiveness between the individual electrode 19 and the bonding layer 777 is improved. As a result, in the embodiment, the thermal head X1 has improved durability.

The bonding layer 777 is made by, for example, applying a predetermined glass paste obtained by mixing glass powder with an appropriate organic solvent onto the main surface 7*e* of the substrate 7 using a known screen printing method or the like, and firing the main surface.

Note that, in the non-disposition area of the heat storage layer 13, the bonding layer 777 includes a non-disposition area 999 in a non-disposition area 888 of the individual electrode 19. A width w1 of the non-disposition area 999 may be greater than, less than, or equal to a width w2 of the non-disposition area 888. When the non-disposition area 999 is located in the non-disposition area 888 of the individual electrode 19, the occurrence of migration caused by diffusion of the electrode material of the individual electrode 19 via the bonding layer 777 can be reduced. As a result, in the embodiment, the thermal head X1 has improved durability.

Figure 11:
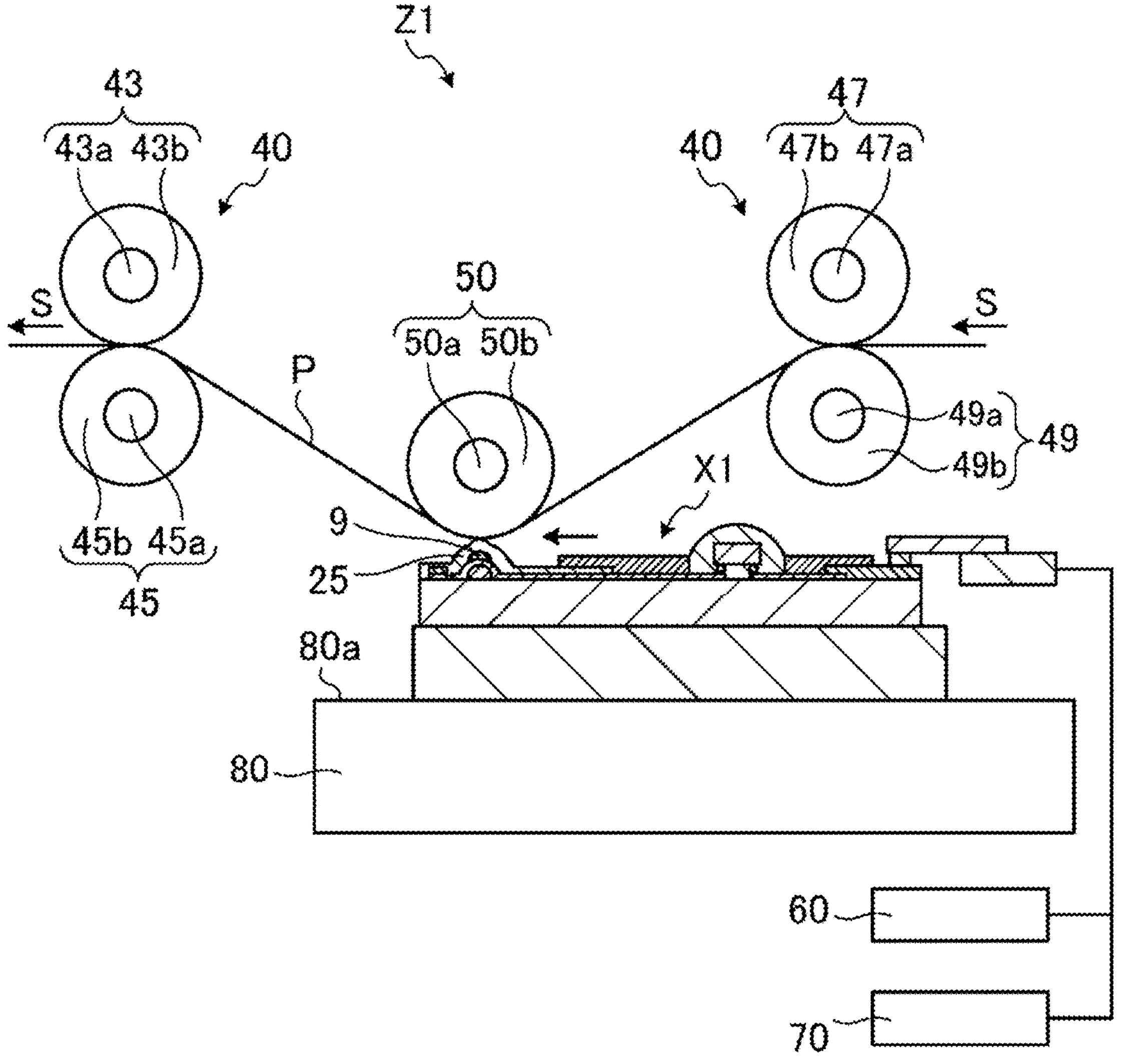
FIG. 11 is a schematic view of a thermal printer according to an embodiment.

A thermal printer Z1 including the thermal head X1 will be described with reference to FIG. 11. FIG. 11 is a schematic view of a thermal printer according to an embodiment.

In the present embodiment, the thermal printer Z1 includes the above-described thermal head X1, a transport mechanism 40, a platen roller 50, a power supply device 60, and a control device 70. The thermal head X1 is attached to a mounting surface 80*a* of a mounting member 80 disposed in a housing (not illustrated) of the thermal printer Z1. Note that the thermal head X1 is attached to the mounting member 80 such that the thermal head is aligned in the main scanning direction orthogonal to a transport direction S.

The transport mechanism 40 includes a drive unit (not illustrated) and transport rollers 43, 45, 47, and 49. The transport mechanism 40 transports a recording medium P, such as heat-sensitive paper or image-receiving paper to which ink is to be transferred, on the protective layer 25 located on a plurality of heat generating parts 9 of the thermal head X1 in the transport direction S indicated by an arrow. The drive unit has a function of driving the transport rollers 43, 45, 47, and 49, and a motor can be used for the drive unit, for example. The transport rollers 43, 45, 47, and 49 may be configured by, for example, covering cylindrical shaft bodies 43*a*, 45*a*, 47*a*, and 49*a* made of a metal such as stainless steel, with elastic members 43*b*, 45*b*, 47*b*, and 49*b* made of butadiene rubber or the like. Note that, if the recording medium P is an image-receiving paper or the like to which ink is to be transferred, an ink film (not illustrated) is transported between the recording medium P and the heat generating part 9 of the thermal head X1 together with the recording medium P.

The platen roller 50 has a function of pressing the recording medium P onto the protective layer 25 located on the heat generating part 9 of the thermal head X1. The platen roller 50 is disposed extending in a direction orthogonal to the transport direction S, and both end portions thereof are supported and fixed such that the platen roller 50 is rotatable while pressing the recording medium P onto the heat generating part 9. The platen roller 50 includes a cylindrical shaft body 50*a* made of a metal such as stainless steel and an elastic member 50*b* made of butadiene rubber or the like. The shaft body 50*a* is covered with the elastic member 50*b*.

As described above, the power supply device 60 has a function of supplying a current for causing the heat generating part 9 of the thermal head X1 to generate heat and a current for operating the drive IC 11. The control device 70 has a function of supplying a control signal for controlling operation of the drive IC 11, to the drive IC 11 in order to selectively cause the heat generating parts 9 of the thermal head X1 to generate heat as described above.

The thermal printer Z1 performs predetermined printing on the recording medium P by selectively causing the heat generating parts 9 to generate heat with the power supply device 60 and the control device 70, while the platen roller 50 presses the recording medium P onto the heat generating parts 9 of the thermal head X1 and the transport mechanism 40 transports the recording medium P on the heat generating parts 9. Note that, if the recording medium P is image-receiving paper or the like, printing is performed onto the recording medium P by thermally transferring, to the recording medium P, an ink of the ink film (not illustrated) transported together with the recording medium P.

Although the embodiments of the present disclosure have been described above, the present disclosure is not limited to the embodiments described above, and various modifications can be made without departing from the spirit thereof. For example, although an example in which the heat generating part 9, the heat storage layer 13, the common electrode 17, the individual electrode 19, the bonding layer 777, and the like are located on the main surface 7*e* of the substrate 7, they may be located on a surface other than the main surface 7*e* of the substrate 7.

Although description has been made using a so-called thick film head including the heat generating resistor 15 formed by printing, the present disclosure is not limited to a thick film head. A thin film head including the heat generating resistor 15 formed by sputtering may be used.

The connector 31 may be electrically connected to the head base 3 directly without providing the FPC 5. In this case, a connector pin (not illustrated) of the connector 31 may be electrically connected to the electrode pad 10.

Although the thermal head X1 including the covering layer 27 is exemplified, the covering layer 27 may not be necessarily provided. In this case, the protective layer 25 may be extended to the region in which the covering layer 27 could be provided.

Further effects and variations can be readily derived by those skilled in the art. Thus, a wide variety of aspects of the present disclosure are not limited to the specific details and representative embodiments represented and described above. Therefore, various changes can be made without departing from the spirit or scope of the general inventive concepts defined by the appended claims and their equivalents.

The invention claimed is:

1. A thermal head, comprising:

a substrate;

an electrode located on the substrate;

a gap between the substrate and the electrode, wherein the gap is surrounded only by the substrate and the electrode; and a conductive component;

wherein glass and the conductive component are in an inner portion of the gap, and the conductive component is closer to the substrate than the glass in the inner portion of the gap.

2. The thermal head according to claim 1, wherein the glass protrudes from the electrode.

3. The thermal head according to claim 1, wherein the glass connects the electrode and the substrate across the gap.

4. The thermal head according to claim 1, wherein the electrode comprises a glass component.

5. The thermal head according to claim 1, further comprising:

a hole open to a main surface of the substrate, wherein the glass is located inside the hole.

6. The thermal head according to claim 1, wherein the substrate comprises a glass component.

7. The thermal head according to claim 1, wherein the electrode is a common electrode connected to a heat generating part.

8. The thermal head according to claim 7, wherein the substrate comprises a heat storage layer protruding in a thickness direction of the substrate, the electrode is located on the heat storage layer, and the gap is located between the heat storage layer and the electrode.

9. A thermal printer, comprising:

the thermal head according to claim 1;

a transport mechanism configured to transport a recording medium onto a heat generating part located on the substrate; and a platen roller configured to press the recording medium onto the heat generating part.

10. A thermal head, comprising:

a substrate;

an electrode located on the substrate; and a gap between the substrate and the electrode, wherein glass is in an inner portion of the gap, the substrate comprises:

a heat storage layer protruding in a thickness direction of the substrate; and a bonding layer between the substrate and the electrode in a non-disposition area of the heat storage layer, the gap is located between the substrate and the bonding layer, and a non-disposition area of the electrode comprises a non-disposition area of the bonding layer.

11. A thermal printer, comprising:

the thermal head according to claim 10;

a transport mechanism configured to transport a recording medium onto a heat generating part located on the substrate; and a platen roller configured to press the recording medium onto the heat generating part.

12. A thermal head, comprising:

a substrate;

an electrode located on the substrate;

a gap between the substrate and the electrode, wherein the gap is surrounded only by the substrate and the electrode; and a conductive component;

wherein glass and the conductive component are in an inner portion of the gap, and the conductive component has a different composition from a composition of the electrode.

13. The thermal head according to claim 12, wherein the glass protrudes from the electrode.

14. The thermal head according to claim 12, wherein the glass connects the electrode and the substrate across the gap.

15. The thermal head according to claim 12, wherein the electrode comprises a glass component.

16. The thermal head according to claim 12, further comprising:

a hole open to a main surface of the substrate, wherein the glass is located inside the hole.

17. The thermal head according to claim 12, wherein the substrate comprises a glass component.

18. The thermal head according to claim 12, wherein the electrode is a common electrode connected to a heat generating part.

19. The thermal head according to claim 18, wherein the substrate comprises a heat storage layer protruding in a thickness direction of the substrate, the electrode is located on the heat storage layer, and the gap is located between the heat storage layer and the electrode.

20. A thermal printer, comprising:

the thermal head according to claim 12;

a transport mechanism configured to transport a recording medium onto a heat generating part located on the substrate; and a platen roller configured to press the recording medium onto the heat generating part.

* * * * *